United States Patent [19]

Gicewicz

[11] Patent Number: 4,912,970

[45] Date of Patent: Apr. 3, 1990

[54] DIAGNOSTIC TESTING DEVICE

[76] Inventor: Gerald P. Gicewicz, 2049 Collett La., Flossmoor, Ill. 60422

[21] Appl. No.: 191,269

[22] Filed: May 6, 1988

[51] Int. Cl.⁴ .......................................... G01M 17/02
[52] U.S. Cl. .................................... 73/146; 73/8; 73/117; 73/122
[58] Field of Search ................ 73/146, 117, 8, 9, 122, 73/124, 128; 33/203.13

[56] References Cited

U.S. PATENT DOCUMENTS

| | | | |
|---|---|---|---|
| 2,137,949 | 11/1938 | Phelps | 33/203 |
| 2,777,211 | 1/1957 | Martin | 33/203.13 |
| 3,187,440 | 6/1965 | Merrill | 33/203.13 |
| 3,411,346 | 11/1968 | Gagliardi | 73/117 |
| 3,546,782 | 12/1970 | Pereue | 33/203.13 |
| 3,587,325 | 6/1971 | Hunter | 73/462 |
| 3,589,182 | 6/1971 | Burett | 73/146 |
| 3,621,247 | 11/1971 | Lide | 250/52 |
| 3,643,337 | 2/1972 | Dick | 33/203.13 |
| 3,729,992 | 5/1973 | Lichtman | 73/146 |
| 3,812,592 | 5/1974 | Haupt | 33/203.13 |
| 3,815,407 | 6/1974 | Lavery | 73/67.2 |
| 3,908,280 | 9/1975 | Murakami | 33/203.13 |
| 4,169,373 | 10/1979 | Clark | 73/146 |

Primary Examiner—Donald O. Woodiel
Attorney, Agent, or Firm—Leydig, Voit & Mayer

[57] ABSTRACT

A diagnostic testing device for diagnosing and testing chassis, mechanical, tire and tire tread problems in vehicles which simulates normal operating angles and normal vehicle weight conditions with the wheels of the vehicle being cycled and steered at a full range of vehicle speeds. The diagnostic testing device includes a support having a horizontal upper surface, a platform movably coupled to the upper surface of the support so as to allow the platform to glide horizontally in any direction, and a pair of support rollers rotatably connected to the platform so as to provide rolling surfaces to contact the tire tread and which allow a tire to cycle and be steered when placed upon said rollers.

38 Claims, 3 Drawing Sheets

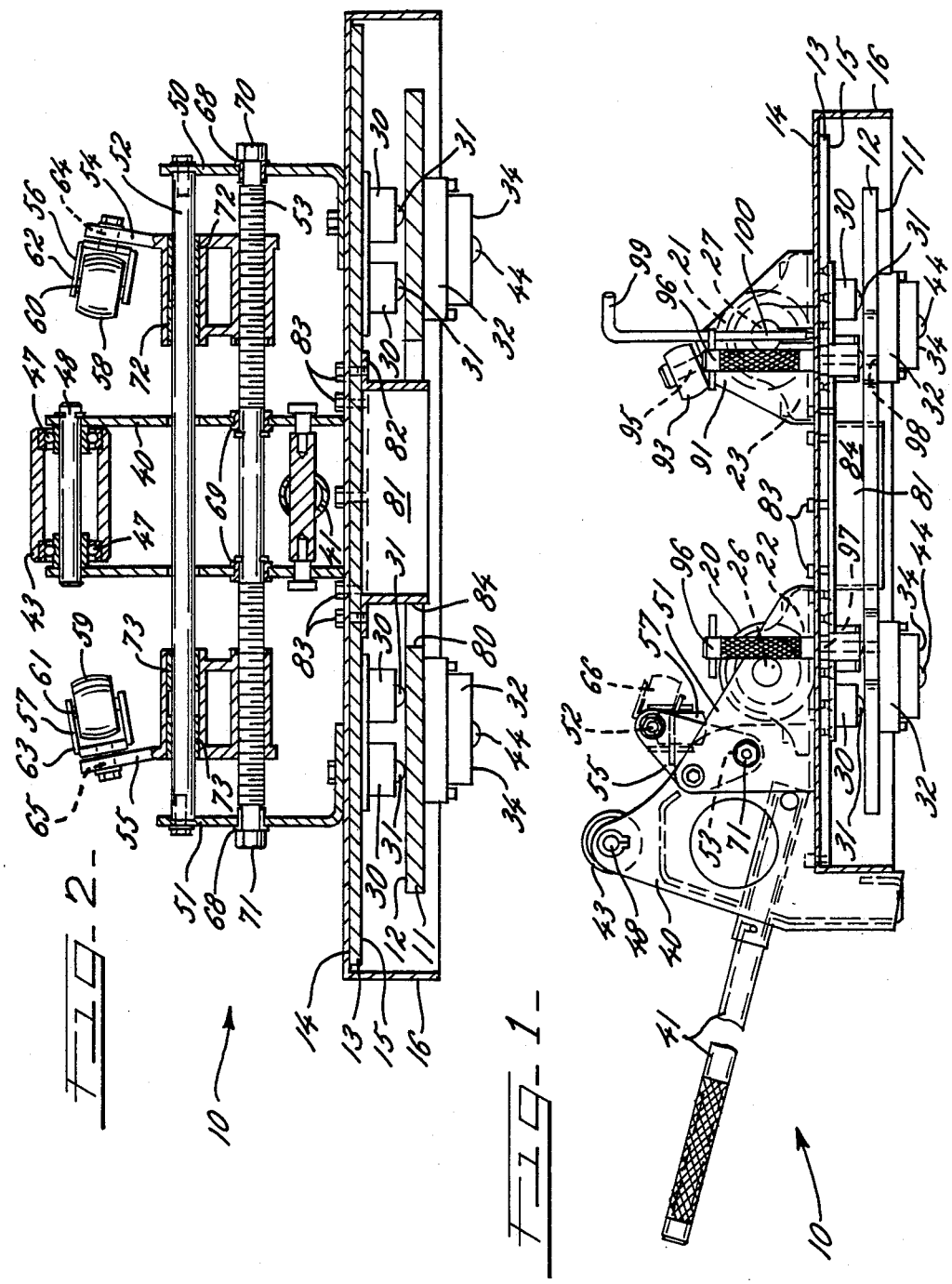

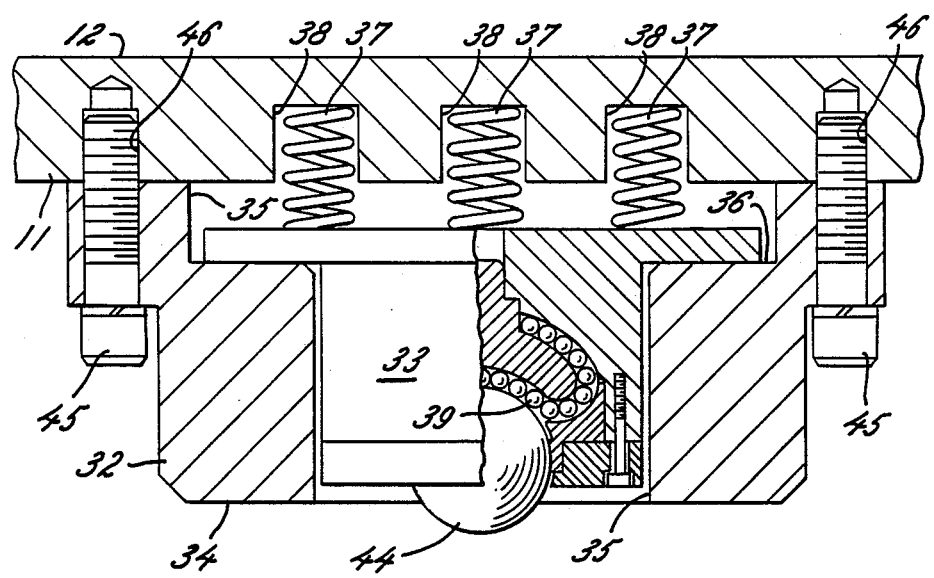
FIG-5-
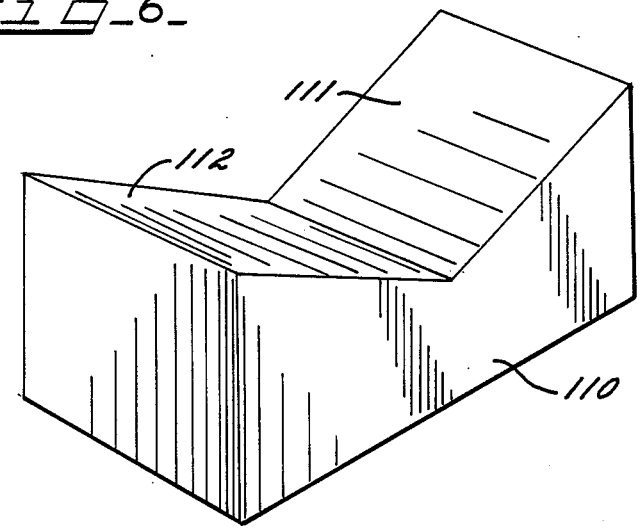
FIG-6-

DIAGNOSTIC TESTING DEVICE

BACKGROUND OF THE INVENTION

This invention relates generally to the testing of vehicles for mechanical defects and tire problems that affect the safety and ride quality of vehicles and more particularly concerns a product useful for testing tires and chassis related problems while the tires are under the full weight of the vehicle and being driven and steered. One of the most troublesome problems in testing vehicles is simulating actual driving conditions similar to those when the problem appears. Of course, road testing of vehicles can be done but it involves risk of accidents and adverse weather and road noise makes many problems unnoticable. Also one cannot view the chassis components but has to observe from the passenger compartment. Testing vehicles inside of a building has been done. For example, some have used dynamometers and chassis dynamometers but such devices do not allow the tires to be steered since they have fixed parallel rollers each of which contact both tires of a single axle of a vehicle. Also when using a dynamometer or chassis dynamometer, both wheels on an axle are driven at the same time so that one wheel cannot be independently driven. Also since a vehicle is restricted in its position during use to avoid having the vehicle travel off the rollers of the dynamometer, the tires exert forces against the rollers.

Some devices have been used to inspect or test tires while not on a vehicle such as those shown in U.S. Pat. Nos. 3,589,182 to Burgett; 3,621,247 to Lide; 3,729,992 to Lichtman and 4,169,373 to Clark; et. al. However, these devices do not have the capability to test the tires on a vehicle or under normal operating conditions.

Other devices are used to align wheels but cannot be used when the wheels are steered such as those shown in U.S. Pat. Nos. 2,777,211 to Martin; 3,587,325 to Hunter; 3,812,592 to Haupt; 3,815,407 to Lavery and 3,908,280 to Murakami; et. al.

Still other devices are used to align wheels and adjust casters, but only have limited ability to steer and cannot be operated at high rates of speed such as sixty (60) to eighty (80) miles per hour as shown in U.S. Pat. Nos. 2,137,949 to Phelps; 3,187,440 to Merrill and 3,546,782 to Pereue; et. al.

When a vehicle is being viewed being driven down a street it will be noticed that each vehicle moves differently (bounce, sway, etc.) depending on the manufactured stiffness of the vehicle's chassis components. This is partly a result of the suspension stiffness and interaction of all suspension components of a vehicle. A sportscar is designed to quickly transmit road variations to the driver so that the driver can react quickly, while a town car is designed to absorb road deviations so that they will not be felt by the passengers. When the weight of a vehicle is removed from its wheels, the wheels will hang down at different angles and stresses as compared to the way they were positioned with the full weight of the vehicle on them. This abnormal angle of the wheels and suspension system of the vehicle changes the relationship of each connecting part and creates forces, sensations and noises which are different than when normal. The normal operating angle of a vehicle is defined as the relationship in degrees or stress that exists between each component in a suspension system of a vehicle while the tires of a vehicle are supporting the weight of the vehicle and are allowed to cycle. Thus, it would be desirable to develop a diagnostic device which would, in a safe controlled environment duplicate a vehicle's own problem symptoms under the vehicle's normal operating angles in order to greatly enhance the diagnosis of mechanical defects that otherwise could not be seen, felt or heard.

Accordingly it is an object of the invention to provide a diagnostic device which will allow for testing of a vehicle in a operational mode which will simulate actual driving conditions.

It is an object to provide a diagnostic device that will test a chassis, wheel, suspension, tires and tire treads of a vehicle under normal operating angles.

It is a further object to provide a diagnostic device that will perform the tests at sound levels low enough to allow the user to hear the location of the problems.

It is a further object to provide a diagnostic device that will perform tests while the tire is cycling and the vehicle is being steered.

It is a further object to provide a diagnostic device that will perform tests while only one wheel on an axle is cycled.

It is a further object to provide a diagnostic device that will allow testing of a vehicle with its wheels being cycled without chaining the vehicle.

It is a further object to provide a diagnostic device that is user friendly and has safety back ups which inhibit a vehicle from leaving the testing device.

It is a further object to provide a diagnostic device that will absorb most of the forces of a cycling or a cycling steered wheel therby allowing the vehicle's chassis to remain in one position, which represents a normal operating angle.

It is a further object to provide a diagnostic device that will absorb all forces of a cycling or a cycling steered wheel thereby allowing the vehicle's chassis to remain motionless, which represents a modified normal operating angle wherein a partially unweighed situation is simulated such as when a vehicle bounces on a road.

SUMMARY OF THE INVENTION

In accordance with the invention, a diagnostic device useful for diagnosing and testing chassis, mechanical, tire and tire tread problems in vehicles includes a support having a horizontal upper surface, a platform movably coupled to the upper surface of the support so as to allow the patform to glide horizontally in any direction, and a pair of support rollers rotatably connected to the platform so as to provide rolling surfaces to contact the tire tread and which allow a tire to cycle when placed upon said rollers.

BRIEF DESCRIPTION OF THE DRAWINGS

Other objects and advantages of the invention will become apparent upon reading the following detailed description and upon reference to the drawings, in which:

FIG. 1 is a side view of a device constructed in accordance with the instant invention showing a partial cut away view along sight line 1—1 of FIG. 3;

FIG. 2 is a sectional view of the device of FIG. 1 taken generally along sight line 2A—2A and sight line 2B—2B of FIG. 3;

FIG. 5 is a partial section view of a component of the device of FIG. 1; and

FIG. 6 is a perspective view of another component used in accordance with the instant invention.

Figure 3:
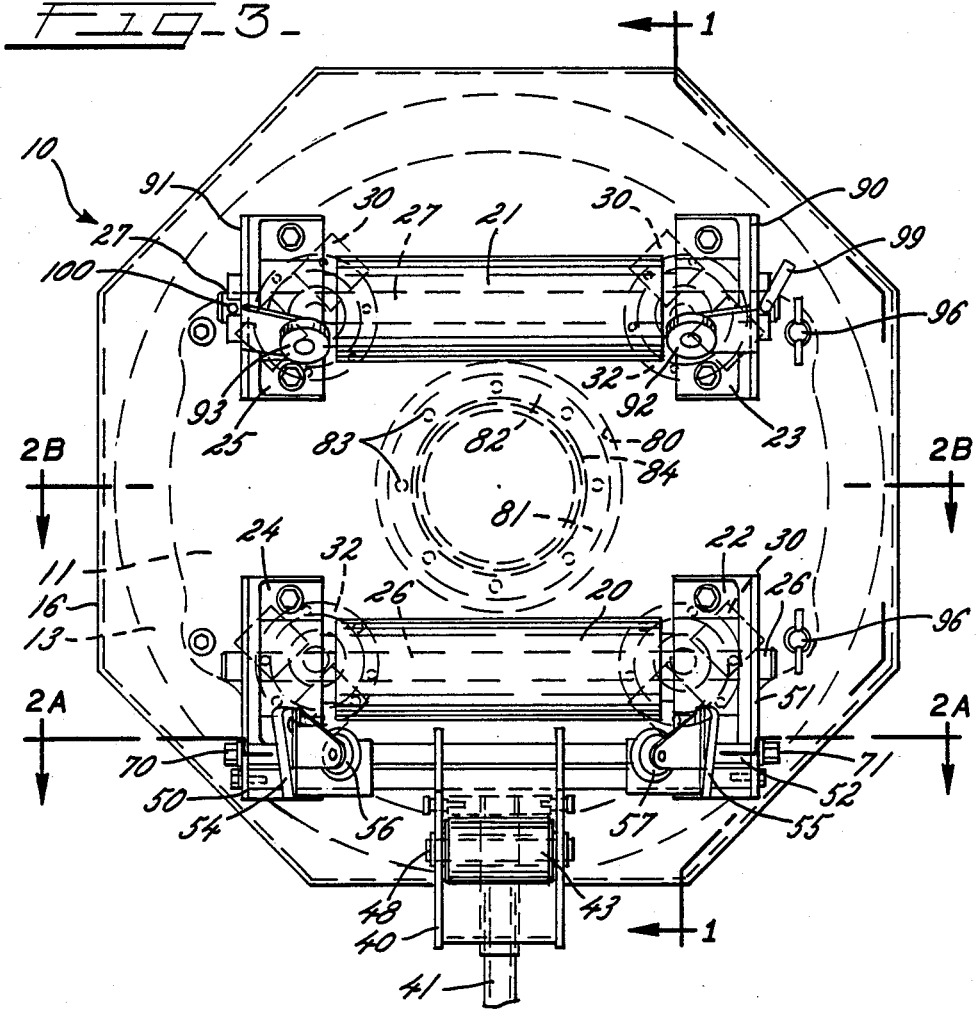
FIG. 3 is a plan view of the device of FIG. 1 with cut away position shown.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, there is shown a diagnostic device 10 constructed in accordance with the principals of the instant invention. Diagnostic device 10 includes a support 11 having a horizontal upper surface 12. Diagnostic device 10 has a platform 13 which is movably coupled to support 11. Platform 13 has an upper side 14 and a lower side 15. An exterior housing 16 is affixed to upper side 14 of platform 13. A front support roller 20 is connected to upper side 14 of platform 13. A rear support roller 21 is connected to upper side 14 of platform 13. Front support roller 20 and rear support roller 21 are rotably connected to platform 13 by means of pillow blocks 22, 23 24 and 25. One suitable pillow block is available as a Dodge S 2000 spherical roller bearing sold by Reliance Electric Co., 2 Roper Court, P.O. Box 499, Greenville, S.C. 29602. Each of pillow blocks 22 and 24 are affixed to platform 13 and have bearings which allow the front axle shaft 26 of front support roller 20 to cycle. Each of pillow blocks 23 and 25 are affixed to platform 13 and have bearings which allow the rear axle shaft 27 of rear support roller 21 to cycle. Front support roller 20 and rear support roller 21 provide rolling surfaces which contact the tire tread of a tire of a vehicle and will allow the tire of the vehicle to cycle when placed upon front support 20 and rear support roller 21. The support rollers can be made of a desirable low friction material and is advantageously made of a light colored Delrin plastic. One source of Delrin plastic is available from McMaster-Carr. A light color Delrin plastic is preferred so that when there is tire scrub caused from some defects such as irregular treads, the rubber which rubs off on the support roller can easily be seen, thereby giving a visual indication of some tire problems. Front axle shaft 26 is parallel to rear axle shaft 27 and preferably made of steel. The front and rear roller supports are about four inches in diameter and are generally about ten inches apart at their closest points. Platform 13 has glide bearings 30 attached to it. Glide bearings 30 include ball bearings 31 which allow platform 13 to glide horizontally in any direction along horizontal upper surface 12 of support 11. Support 11 has foot bearings 32 which allow diagnostic device 10 to be moved along a floor when the weight of a vehicle is not placed on diagnostic device 10, but which have spring loaded bearings 33 which retract when the weight of a vehicle is placed upon diagnostic device 10 allowing the lower surfaces 34 of foot bearings 32 to support diagnostic device 10 and keep support 11 from moving.

FIG. 5 shows a partial sectional view of foot bearing 32. Foot bearing 32 has a central cavity 35 which allows bearing 33 to slide vertically up or down. Downward movement of bearing 33 is restricted by the horizontal surface 36 of central cavity 35. Upward movement of bearing 33 is restricted by springs 37. Springs 37 fit in appropriate recesses 38 in support 11. Internal balls 39 allow ball bearing 44 to freely rotate. The entire foot bearing 32 is affixed to support 11 by bolts 45 attached to threaded recesses 46 in support 11.

The spring loaded bearings and the glide bearings can be made of a bearing that will provide 360° freedom of movement. It is preferred that the glide bearing be fixed to the lower side of the platform under the portion of the platform that bears the weight of the support rollers. Some suitable bearings are made by General Bearing Corporation, Route 303, Blauvelt, N.Y. 10903, and sold as Genbearco Autotrack Ball Transfers 1251, and part numbers 1261 and 1262.

The gliding action of the platform 13 allows the tires to maintain their lowest center of gravity relationship to the freespinning pair of support rollers 20 and 21 thereby allowing the support rollers to move perpendicularly to the tire and thus restricting lateral walking. This is unlike a situation in a dynamometer where the tire will want to walk completely off the rollers of the dynamometer but cannot because the vehicle is chained. Thus, in a dynamometer the tire will never be relaxed but will be exerting forces against the rollers. Additional complications in a dynamometer are caused by their rollers supporting both tires of an axle so that each tire works with or against the other tire.

A front retention bracket 40 is affixed to upper side 14 of platform 13 and a handle 41 can be removably connected to front retention bracket 40 to aid a user in moving diagnostic device 10 around a floor 42 while there is no vehicle placed upon diagnostic device 10. Front retention bracket 40 includes a front retention roller 43 which will inhibit a vehicle from running forward off of diagnostic device 10 or throwing diagnostic device 10 behind or from under the tire in case of tipping or locking of diagnostic device 10 or its components. Front retention roller 43 is rotatably connected by bearings 47 to front retention roller axle 48.

Side retention brackets 50 and 51 include an alignment shaft 52 and a threaded shaft 53 which provide support for two side retention assemblies 54 and 55. Side retention assembly 54 includes an offset caster 56. Side retention assembly 55 includes an offset caster 57. As best seen in FIG. 2, offset caster 56 includes a wheel 58 rotatably connected by a center axle 60 to a caster housing 62. Caster housing 62 is rotatably connected by an offset axle 64 to side retention assembly 54. The center axis of offset axle 64 is offset from the center axis of center axle 60 of wheel 58. As best seen in FIG. 2, offset caster 57 includes a wheel 59 rotatably connected by a center axle 61 to a caster housing 63. Caster housing 63 is rotatably connected by an offset axle 65 to side retention assembly 55. The center axis of offset axle 65 is offset from the center axis of center axle 61 of wheel 59. As best seen in FIG. 1, offset caster 57 will normally hang down. Phantom position 66 of offset caster 57 shows a possible alignment of offset caster 57 when it is contacted by a cycling tire supported on front support roller 20 and rear support roller 21. The offset casters of the side retention assemblies will self-align to different size tires and eliminates the need for an operator to make adjustments for different tire sizes. The offset casters will restrict the tires from laterally walking off of the support rollers and from contacting any of the obstructions on top of the diagnostic device. This prevents damage to the side walls of the tires and keeps the vehicle on the support rollers without chaining the vehicle down. This placement of offset swivel rollers over the end of each front support roller redirects the tire back toward the center of the support rollers.

Side adjustment hex heads 70 and 71 allow threaded shaft 53 to be turned to drive side retention assemblies 54 and 55 toward or away from one another. A user can drive hex heads 70 and 71 with a wrench or by a suitable electric or pneumatic drill. Threaded shaft 53 is rotatably connected to side retention brackets 50 and 51 by shaft bearings 68. Threaded shaft 53 is rotatably connected to front retention bracket 40 by shaft bearings 69. Threaded shaft 53 is reverse threaded on each side so that as it is rotated in one direction side retention assemblies 54 and 55 move away from each other and as threaded shaft 53 is rotated in the opposite direction, side retention assemblies 54 and 55 move toward each other. Side retention assemblies 54 and 55 are threaded to match the respective thread of threaded shaft 53. Side retention assembly 54 has shaft bearings 72 which allow side retention assembly 54 to slide along alignment shaft 52. Side retention assembly 55 has shaft bearings 73 which allow side retention assembly 54 to slide along alignment shaft 52. Side retention assemblies 54 and 55 can be used to center the tire on the support rollers 20 and 21. A force can be exerted upon the tire by offset casters 56 and 57. Similarily, if a tire wants to travel off of support rollers 20 and 21 it will be restricted by one of the offset casters 56 or 57.

As best seen in FIGS. 2 and 3, support 11 has an inner opening 80. A range restrictor 81 is affixed to lower side 15 of platform 13. Range restrictor 81 has a lip 82 which allows it to be affixed to platform 13 by bolts 83. Range restrictor 81 has a side wall 84 which restricts the horizontal travel of platform 13 over support 11.

During use, platform 13 can glide horizontally over support 11 freely until sidewall 84 contacts inner opening 80. When that occurs, then the tire will exert a force against the diagnostic device 10 that will cause it to travel. If this occurs, the operator should lift the vehicle from diagnostic device 10 and reposition diagnostic device 10 so that the platform can move freely. In use it has been found that allowing platform 13 to travel from one inch to one and one-half inch in any direction from center is adequate for most vehicle applications. It is desirable to have the travel be one and one-half inch from center or a total of three inches from side to side total travel.

As best seen in FIG. 3, a rear retention bracket 90 and a rear retention bracket 91 are affixed to upper side 14 of platform 13. A rear retention wheel 92 is rotatably connected to rear retention bracket 90 and a rear retention wheel 93 is rotatably connected to rear retention bracket 91. As best seen in FIG. 1, rear retention wheel 93 rotates around rear retention wheel axle 95. Generally, rear retention wheels 92 and 93 will not contact a tire when the tire is being cycled in a forward rotation. However, if an operator should cycle the tire in a reverse rotation, the tire may want to travel off the rear support roller 21. Then, one of the rear retention wheels 92 or 93 will restrict the tire from leaving rear support roller 21.

Figure 4:
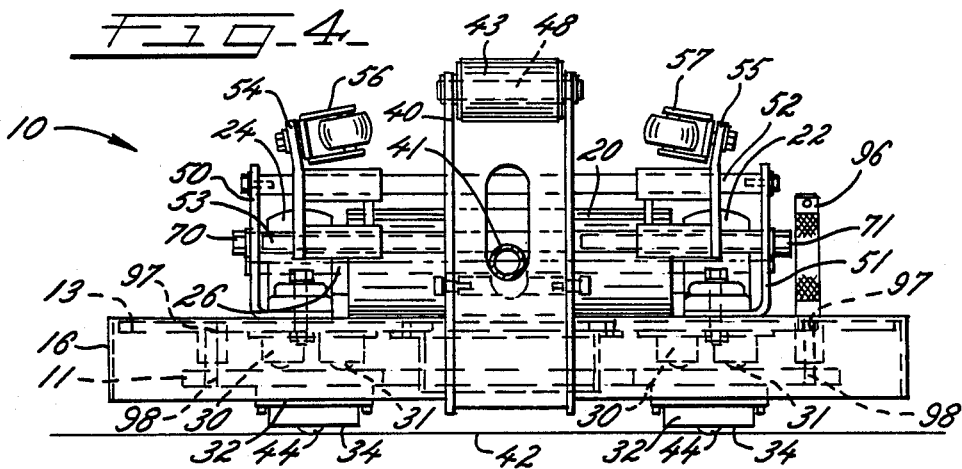
FIG. 4 is a elevation view of the device of FIG. 1.

As seen in FIGS. 1, 3 and 4, two centering lock pins 96 connect platform 13 and support 11 in a centered position and when fastened restrict horizontal gliding movement between platform 13 and support 11. Centering lock pins 96 pass through centering lock holes 97 in platform 13 and fasten into centering lock pin channels 98 in support 11. Centering lock pins 96 are fastened while diagnostic device 10 is moved around and positioned under the tire of a vehicle and while the vehicle is lowered upon diagnostic device 10. This allows the diagnostic device to self center to the tires of the vehicle. They are then released to allow platform 13 to glide horizontally over support 11 as the appropriate tire is cycled upon diagnostic device 10.

A support roller lock 99 passes through rear axle shaft 27 of rear support roller 21 into support roller lock channel 100 and when in locking position restricts rear support roller 21 from rotating. Support roller lock 99 restricts rear support roller 21 from rotating and provides enough traction for the tire to not rotate upon diagnostic device 10. For some testing operations it may be desirable to have a wheel not move (such as in testing differentials or individual wheels). For those tests, support roller lock 99 is inserted to lock that particular wheel. A safety feature of support roller lock 99 is that it cannot be inserted while a wheel is cycling. In most operations of diagnostic device 10, support roller lock 99 is removed from diagnostic device 10 so as to allow rear support roller 21 to spin freely. The support roller lock 99 allows an operator to study the motion of a pre-selected wheel individually. By locking one support roller, the vehicle's differential is forced to drive the opposite tire. Only one support roller lock 99 is supplied per set of diagnostic devices to hinder an operator from locking support rollers for both wheels of the same axle simultaneously. However, even if an operator did lock both support rollers for both wheels of the same axle, the tires would slip on the Delrin plastic of the support rollers due to the Delrin plastic's low friction characteristics.

FIG. 6 shows a height matching block 110 which has inclined surfaces 111 and 112. Inclined surfaces 111 and 112 are designed so that the tire of a vehicle will be the same height off the ground as if it were placed on diagnostic device 10 with spring loaded bearings 33 retracted and lower surfaces 34 of foot bearings 32 touching the ground. To provide for normal operating angles, each tire of a vehicle must rest upon a diagnostic device 10 or a height matching block 110.

In use of the diagnostic device of the instant invention, a vehicle is first raised on a hoist. Then, generally two diagnostic devices are placed under the tires of one axle of a vehicle and two height matching blocks are placed under the tires of the other axle of the vehicle. The diagnostic devices have their centering lock pins inserted so that the platform is locked to the support and the lock pins are inserted in the side of the diagnostic device on the outside of the vehicle. The support roller lock is removed to allow the self-centering action of the diagnostic device. The offset casters of the side retention assemblies are tightened so they are close to the tires to align the diagnostic device so that the tire is centered within the diagnostic device. The vehicle is then slowly lowered onto the diagnostic devices and the height matching blocks. The height matching blocks are centered manually. The diagnostic devices center themselves as the weight of the vehicle is placed on the unit. This is accomplished by the spring loaded bearings 33 allowing the diagnostic device to move along the floor as the spring loaded bearings are being withdrawn into the foot bearing 32. When the weight of the vehicle overcomes the spring force, the foot bearing lower surfaces contact the ground to provide a firm footing for the support 11. The side retention assemblies are then backed away from the tires so that they do not contact the tires for most applications and the centering lock pins are removed from both diagnostic devices. If only one wheel is to be cycled, then the support roller lock is inserted. The wheels of the vehicle placed on the diagnostic devices can then be cycled or steered as desired. The tires are cycled for a period of time in order to bring the tires up to a normal operating temperature because the tire behaves differently if cool. The vehicle can then be tested at its full range of speeds up to the highest speed of the vehicle. Many of the tests require highway speeds of forty to eighty miles per hour.

It has been found that a device constructed in accordance with the instant invention can test for the following problems in a vehicle:

I. TIRES

A. Lateral Run-Out
B. Radial Run-Out
1. side wall stiffness variation
C. Tire Noise

II. WHEELS

A. Lateral Run-Out
B. Radial Run-Out
C. Vibration
D. Noise
1. Lug Bolts
2. Hub Caps
3. Wheel

III. STEERING (Front Wheel Drive)

A. Looseness
B. Non-Free Flowing Pull
C. Wander
D. Cornering Return

IV. FRONT DRIVE AXLES

A. Constant Velocity Joints
1. Inner
2. Outer
3. Boots
4. Noise
B. Wheel Bearings
1. Noise
2. Vibration

V. PROPELLER (Drive Shaft) REAR DRIVE

A. Drive Line Vibration
B. Noise
C. Looseness
D. Center Carrier Bearings
E. U-Joints

VI. FINAL DRIVE (Differential)

A. Pinion Noise
1. Bearings
2. Looseness
B. Ring Gear
1. Noise
2. Looseness
C. Carrier Side Bearing
1. Noise
2. Looseness
3. Spider Gears
D. Rear Axle Shaft
1. Bearing
2. Run-Out

VII. FRONT SUSPENSION

A. Upper Control Arm Bushings
B. Lower Control Arm Bushings
C. Strut Rod Bushings
D. Springs

VIII. BRAKES

A. Emergency
B. Automatic Braking System
C. Noise

X. CLUTCH

A. Chatter
B. Vibration

XI. MANUAL TRANSMISSION

A. Noise
B. Vibration

XII. AUTOMATIC TRANSMISSION

A. Noise
B. Vibration
C. Torque Converter Lock Up

XIII. ENGINE

A. Noise
B. Accessory Drive
C. Vehicle Computer Controls
D. Vibrations
E. Exhaust
1. Noise
2. Vibration During use of the device of the instant invention, problems or defects in the tire or wheel or chassis components can be detected visually, audibly and by touch. In observation of a problem an operator can sychronize the noise with the movement which can be observed both visually and through sensing movement. This is an advantage over dynamometers which have large hollow drums which generate levels of sound which mask the sounds of the tire or chassis problem. An operator can use a sound level meter by holding it near to a problem tire and the needle will indicate a noise variation as the irregular portion of the tire contacts the support roller. This technique is useful at very low speeds of tire cycling to detect belt separation or tread irregularity.

During the testing of many tire and chassis problems, the best indication of the problem is by movement of the platform. For example, for a tire that is radially out of round, the platform moves front to back repeatedly. For a tire that is laterally out of round, the platform moves side to side repeatedly. For problems which occur only at certain speeds the wheel can be driven at precisely that speed and the extent of the platform's movement will increase as that speed is approached.

The diagnostic device allows an operator to predetermine the operating angles desired. The diagnostic device absorbs the forces generated by a cycling and turning wheel, the vehicle can be left on a hoist with all or part of the vehicle's weight on the diagnostic device. That will simulate normal or unweighed road conditions. The diagnostic device allows for turning applications with the vehicle maintaining its proper operating angles. Chassis dynamometers with rollers which contact both wheels cannot tolerate steering applications.

The free floating platform allows a separate unit to absorb forces for each individual wheel. In cycling or turning applications which otherwise would redirect forces caused by resistance of the tires or other defects in the mechanics or chassis of the vehicle back to the vehicle, the movement is transferred to the diagnostic devices with virtually no resistance of the diagnostic device itself. Since the support rollers are on the floating platform, the support rollers adjust to the tires instead of the vehicle moving to adjust to the support rollers. The combination of the platform and the support creates a floating field under the support rollers which allows the configuration of a tire and the gravitational pull on the vehicle to move the support rollers in such a way that virtually no forces are transferred to the vehicle and which allow the vehicle to remain stationary no matter what position the tires are in. Of course, the vehicle may vibrate and bounce or sway as a vehicle does upon a road surface, but the vehicle will not tend to move sideways or forwards or backwards off the diagnostic devices.

When it is desired to cycle a non-drive tire, the operator may cycle it by hand or by any type of drive mechanism available on the market. Those drive mechanisms can include a driven roller which is contacted with the tire tread for example. The placement of the drive force other than thru the support rollers as is done in a dynamometer, allows the support rollers to remain free-spinning and prevents the support rollers from locking up and creating a friction base for the tires to grab. This inhibits the vehicle from leaving the diagnostic device. Additionally, using a low friction material for the support roller causes the wheel to slide over two locked support rollers.

One very desirable feature of the invention is that it can be used to diagnose four-wheel drive and four-wheel vehicles. When this is done, each of all four wheels must be placed upon a diagnostic device and the height matching blocks are not used.

Thus it is apparent that there has been provided, in accordance with the invention, a diagnostic testing device that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly it is intended to embrace all such alternatives, modifications and variations as fall within the spirit and broad scope of the appended claims.

I claim:

1. A diagnostic device useful for diagnosing and testing chassis, mechanical, tire and tire tread problems in vehicles including:
   a support having a horizontal upper surface;
   a platform having an upper side and a lower side, and said lower side of said platform being glidably connected to said upper surface of said support so as to allow said platform to glide horizontally in any direction;
   a pair of support rollers rotatably connected to said platform so as to provide rolling surfaces to contact said tire tread and which allow a tire to cycle when placed upon said rollers wherein each of said support rollers has an axis and wherein each axis of said support roller is parallel to said axis of said other support roller;
   wherein said support rollers will adjust to a tire when the tire is cycled;
   a pair of side retention rollers attached to said upper side of said platform so as to restrict a tire from traveling off said pair of support rollers when a tire is cycled forward; and,
   wherein a tire can be steered while cycling and said support rollers allow self alignment of said platform to a cycling tire and the tire will avoid traveling off said support rollers.

2. A diagnostic device as in claim 1 wherein said movable coupling allowing said platform to glide horizontally in any direction is contained substantially within one plane.

3. A diagnostic device as in claim 1 having a rotatable drive means attached to said platform which can be placed against said tire and cycle said tire.

4. A diagnostic device as in claim 1 having a pair of centering lock pins which can lock said platform and said support together.

5. A diagnostic device as in claim 1 wherein said tire has a sidewall and wherein said side retention rollers self align with said tire on contact with said sidewall of said tire.

6. A diagnostic device as in claim 1 wherein said side retention roller comprises an offset caster.

7. A diagnostic device as in claim 6 wherein said caster has a contact surface for contact with said tire wherein said contact surface is in the shape of a wheel having its edges rounded.

8. A diagnostic device as in claim 1 having a pair of reverse retention rollers attached to said upper side of said platform so as to restrict a tire from traveling off said pair of support rollers when a tire is cycled in reverse.

9. A diagnostic device as in claim 8 wherein said tire has a sidewall and wherein said reverse retention rollers may contact said sidewall of said tire.

10. A diagnostic device as in claim 1 having a front retention roller attached to said upper face of said platform.

11. A diagnostic device as in claim 10 wherein said front retention roller comprises a roller which is capable of contacting the tread of said tire at a point higher than said pair of support rollers contact said tire tread.

12. A diagnostic device as in claim 1 wherein said tire can be cycled at highway speeds of forty to eighty miles per hour.

13. A diagnostic device as in claim 1 wherein said pair of side retention rollers have a shaft which allows for adjustment of movement toward or away from said tire.

14. A diagnostic device as in claim 1 wherein said support rollers are made of Delrin plastic.

15. A diagnostic device as in claim 1 wherein said support rollers are of a light color.

16. A diagnostic device as in claim 1 wherein one of said support rollers includes an axle shaft with a hole in it and a locking pin which may be removably inserted in said hole so as to restrict movement of said support roller.

17. A diagnostic device as in claim 1 wherein when a tire is cycling on said support rollers, the sound level is less than 40 decibles.

18. A diagnostic device as in claim 1 wherein said platform has a horizontal freedom of movement in any direction from center for a distance of from one inch to one and one-half inch.

19. A diagnostic device as in claim 1 wherein said support has a center opening and platform has a center wall extending down in to said center opening of said support, wherein when said platform is centered upon said support, there is a clearance at all points between said center wall and said center opening of from one inch to one and one-half inches.

20. A diagnostic device as in claim 1 wherein each of said support rollers are rotatably connected to said uppper side of said platform by a pair of pillow blocks.

21. A diagnostic device as in claim 20 wherein said platform has glide bearings located substantially under said pillow blocks upon said lower side of said platform.

22. A diagnostic device as in claim 21 wherein said glide bearings are located so that said tire will always be located above and within a perimeter defined by said glide bearings.

23. A diagnostic device useful for diagnosing and testing chassis, mechanical, tire and tire tread problems in vehicles including:
    a support having a lower side and a horizontal upper surface;
    a platform having an upper side and a lower side, its lower side movably coupled to said upper surface of said support so as to allow said platform to glide horizontally in any direction;
    foot bearings attached to said lower side of said support which allow such support to move freely in any direction when there is no vehicle upon said diagnostic device and which renders said support immobile when a vehicle is placed upon said diagnostic device; and
    a pair of support rollers rotatably connected to said upper side of said platform so as to provide rolling surfaces to contact said tire tread and which allow a tire to cycle when placed upon said rollers.

24. A diagnostic device as in claim 23 wherein said foot bearings include:
    a bearing housing having an upper surface, vertical sidewalls, and a bearing in its lower surface wherein said bearing can freely rotate in any direction;
    said bearing housing being mounted in a central cavity having an upper surface, a lower surface and vertical walls which match said vertical side walls of said bearing housing and arranged so that the bearing housing can slide vertically up or down in said central cavity; and
    said upper surface of said bearing housing being linked by at least one spring having a spring tension and spring force to said lower side of said support wherein said spring tension is predetermined to allow said bearing of said support bearing housing to extend below said lower surface of said central cavity when there is not the weight of a vehicle on said platform and to allow said bearing of said support bearing housing to retract upwards of said lower surface of said central cavity when there is the weight of a vehicle on said platform.

25. A diagnostic device as in claim 24 wherein said spring comprises a plurality of springs having predetermined spring tensions and a user may adjust said spring tensions to adjust for the weight of said platform and desired weight of said vehicle necessary to compress said springs.

26. A diagnostic device as in claim 23 wherein each of said support rollers has an axis and wherein each axis of said support roller is parallel to said axis of said other support roller.

27. A diagnostic device as in claim 23 having a pair of side retention rollers attached to said upper side of said platform so as to restrict a tire from traveling laterally off said pair of support rollers when a tire is cycled forward.

28. A diagnostic device as in claim 27 wherein said tire has a sidewall and wherein said retention rollers contact said sidewall of said tire.

29. A diagnostic device as in claim 27 wherein said side retention roller comprises an offset caster.

30. A diagnostic device as in claim 29 wherein said offset caster has a contact surface for contact with said tire wherein said contact surface is in the shape of a wheel having its edges rounded.

31. A diagnostic device as in claim 27 having a pair of reverse retention rollers attached to said upper side of said platform so as to restrict a tire from traveling off said pair of support rollers when a tire is cycled in reverse.

32. A diagnostic device as in claim 31 wherein said tire has a sidewall and wherein said reverse retention rollers may contact said sidewall of said tire.

33. A diagnostic device as in claim 23 having a front retention roller attached to said upper side of said platform.

34. A diagnostic device as in claim 33 wherein said front retention roller comprises a roller which is capable of contacting the tread of said tire at a point higher than said pair of support rollers contact said tire tread.

35. A diagnostic device useful for diagnosing and testing chassis, mechanical, tire and tire tread problems in vehicles including:
    a support having a horizontal upper surface;
    a platform movably coupled to said upper surface of said support by a plurality of ball bearings having a 360° freedom of movement and allowing said platform to glide horizontally in any direction;
    a pair of support rollers rotatably connected to said platform so as to provide rolling surfaces to contact said tire tread and which allow a tire to cycle when placed upon said rollers wherein each of said support rollers has an axis and wherein each axis of said support roller is parallel to said axis of said other support roller wherein said support rollers will adjust to a tire when the tire is cycled and steered while cycling; and,
    a pair of side retention rollers attached to said platform so as to restrict a tire from traveling off said pair of support rollers when a tire is cycled forward and wherein said tire can be steered while cycling without traveling off said support rollers.

36. A diagnostic device as in claim 35 wherein said platform has an upper side and a lower side, and said support rollers are rotatably affixed to said upper side of said platform by two pairs of roller bearings.

37. A diagnostic device as in claim 36 wherein said plurality of ball bearings movably coupling said platform and said support are fixed on the lower side of said platform in an area substantially under the positions of said two pairs of roller bearings.

38. A diagnostic device as in claim 36 wherein said plurality of ball bearings movably coupling said platform and said support are located so that said tire will always be located above and within a perimeter defined by said plurality of ball bearings.

* * * * *